(12) United States Patent
Gonsalves

(10) Patent No.: US 6,378,615 B1
(45) Date of Patent: Apr. 30, 2002

(54) RETENTION ENHANCEMENT FOR VIBRATION REDUCING HORSESHOES

(76) Inventor: C. J. Gonsalves, 1620 Bluebird Rd., Glendora, CA (US) 91741

(*) Notice: Subject to any disclaimer, the term of this patent is extended or adjusted under 35 U.S.C. 154(b) by 0 days.

(21) Appl. No.: 09/231,677

(22) Filed: Jan. 14, 1999

(51) Int. Cl.[7] .................................................. A01L 3/00
(52) U.S. Cl. ....................................................... 168/13
(58) Field of Search ................................. 168/4, 12, 13, 168/14

(56) References Cited

U.S. PATENT DOCUMENTS

| | | | | |
|---|---|---|---|---|
| 28,656 A | * | 6/1860 | Coleman | 168/12 |
| 304,516 A | * | 9/1884 | Fenno | 168/11 |
| 479,912 A | * | 8/1892 | Mooney | 168/12 |
| 624,529 A | * | 5/1899 | Paar | 168/13 |
| 711,475 A | * | 10/1902 | Conroy | 168/12 |
| 825,437 A | * | 7/1906 | White | 168/14 |
| 971,138 A | * | 9/1910 | McCormick | 168/12 |
| 2,705,536 A | * | 4/1955 | Phreaner | 168/14 |
| 3,200,885 A | * | 8/1965 | Johnson | 168/12 |
| 4,645,008 A | * | 2/1987 | Benning | 168/11 |
| 5,137,093 A | * | 8/1992 | Stephens | 168/12 |
| 5,172,766 A | * | 12/1992 | Adkins | 168/14 |

\* cited by examiner

*Primary Examiner*—Peter M. Poon
*Assistant Examiner*—Son T. Nguyen
(74) *Attorney, Agent, or Firm*—Donald D. Mon

(57) ABSTRACT

A horseshoe having a metal shoe and a shock-absorbing pad abutting it and between it and the horse's hoof. A stud on each of the pads is cemented into a recess in each arm of the to resist shear and peeling forces on the pad.

4 Claims, 3 Drawing Sheets

RETENTION ENHANCEMENT FOR VIBRATION REDUCING HORSESHOES

FIELD OF THE INVENTION

Horseshoes which attenuate vibration energy from the horseshoes to the leg of the animal, especially of race horses.

BACKGROUND OF THE INVENTION

A 1500 pound race horse running at perhaps 30 miles per hour places a heavy impact load on its feet. Especially there is a peak shock load at the moment of impact. A metal horseshoe is shaped as a U, and a blow on it will cause it to vibrate, essentially to "ring".

The shoe is tightly attached to the hoof by nails so the ringing vibration is readily transmitted to the animals's leg. In addition this energy works on the nails, adding to the tendency of the nails to loosen as the result of flexure of the hoof itself.

Shoes are often thrown during vigorous exercise and racing and must be carefully watched. Expensive race horses may need to be re-shod as frequently as every four to five weeks. It is an economic advantage to lengthen this period, especially for less valuable horses whose earnings cannot support optimum care.

A well-known horseshoe which dampens and thereby reduces the vibrations, and which is intended to reduce the peaks of the impact force loads, is the No-Vibe horseshoe manufactured and sold by the inventor herein, and available from No-Vibe Co., 1620 Bluebird Road, Glendora, Calif. 91741. It constitutes a metal shoe with a layer of shock-absorbing solid organic plastic material cemented to the upper surface of the metal shoe. When the animal is shod, nails are pounded into the hoof through the shoe with the pad bearing against the hoof. The pad is disposed between the metal shoe and the hoof itself.

When the front foot of a running horse first strikes the ground, it lands with its hoof tilted up. The rear end strikes first, the rear end is the open end, with the points of the horseshoe pointing toward the rear. Then as the horse moves forwardly the bottom of the hoof tilts forwardly. The forward end (with the bight and perhaps a cleat) engages the ground and digs in, and the hoof tilts still more as it leaves the ground. This all occurs very quickly.

There is an additional component of motion of the hoof. Its movement is not a simple forward tilt as suggested above. Instead, immediately upon impact the hoof begins a twisting motion around the hoof axis. This put an additional shear force on the cement layer which holds the pad to the metal shoe. Reduction of vibration relies heavily on a tight intimate joinder of the pad and the shoe, as well as of the pad and the hoof.

Retention of the pad by the cement and the nails is quite effective over most of the area of the shoe, especially in its center bight and along most of its arms. However, the situation is more complicated near the free end of the arms. For about the last inch of each arm there is insufficient hoof material to receive a nail, so unless other retention is provided, the cement layer must take all of the shear load when the pointed ends first strike the ground. In addition, because these two ends do strike the ground first, there is a strong force tending to peel the pad from the metal shoe.

In the previously mentioned No-Vibe horseshoe, this situation was countered by riveting the pad to the metal shoe with a countersunk rivet whose head is sunk in the pad. This has been generally successful, except that if the pad wears too much, the rivet head becomes exposed and may contact the hoof. This can cause a corn on the hoof, which is intolerable for a race horse. Also, the active rubbing together of the rivet shank and rivet head on the pad can cause undesirable wear on the pad and lead to premature separation.

It is an object of this invention to provide a metal horseshoe with a plastic pad adhesively attached to it with an additional retention means to withstand both peeling separation and shear forces, but without requiring a third discontinuous element of dissimilar physical characteristics such as a metal rivet.

BRIEF DESCRIPTION OF THE INVENTION

An improved horseshoe according to this invention includes a metal shoe having a general U shape including a central bight and an arm extending from each end of the bight. Each arm has a tip. The shoe includes a flat surface and an opposite wear surface with appropriate ground-engaging elements such as grooves or cleats as appropriate. Openings through the metal shoe pass nails which are driven through them into the hoof to hold the shoe in place. A flat organic plastic pad with two oppositely facing flat surfaces is laid upon and cemented to the flat surface of the shoe, intended to bear against the hoof when the animal is shod. The nails are driven through this pad.

According to a preferred feature of this invention, the pad includes a stud of like material integral with the rest of the pad and projecting from one of its flat faces. The flat surface of the metal shoe includes a recess having substantially the same lateral dimensions as the stud, and the pad and the stud are cemented respectively to the flat surface and to the wall of the recess.

According to an optional feature of the invention, the stud, instead of being formed unitary with the pad, is a separated body cemented to the pad, preferably made of like material.

The above and other features of this invention will be fully understood from the following detailed description and the accompanying drawings, in which:

DETAILED DESCRIPTION OF THE INVENTION

Figure 1:
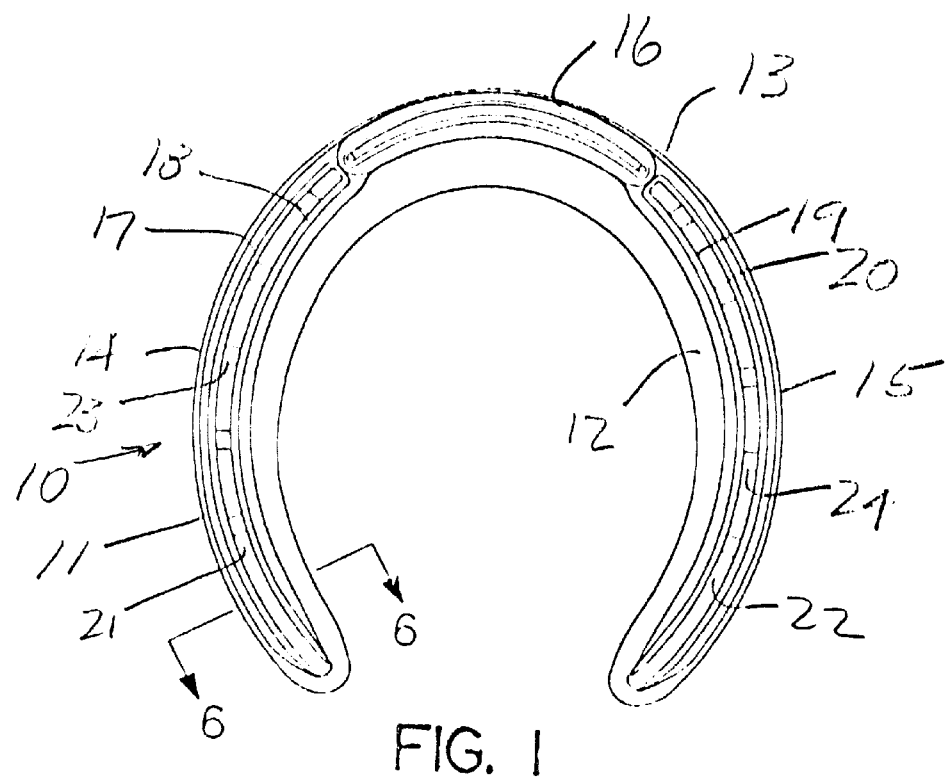
FIG. 1 is a plan view of the ground-facing wear surface of the preferred embodiment of this invention.

A horseshoe 10 according to this invention is shown in FIG. 1. It includes a metal shoe 11 whose lower wear surface 12 is shown in this FIG. It is generally U shaped, having a bight section 13 and two arms 14, 15. An optional cleat 16 is formed on the bight. Ridges 17, 18, 19 and 20 extend along the arms to form grooves 21, 22 through which series of nail holes 23, 24 are respectively formed.

It is to be understood that features such as the ridges, grooves and cleat are optional. They may be omitted, and other shapes useful for horseshoes such as clogs may be used also or instead.

Figure 2:
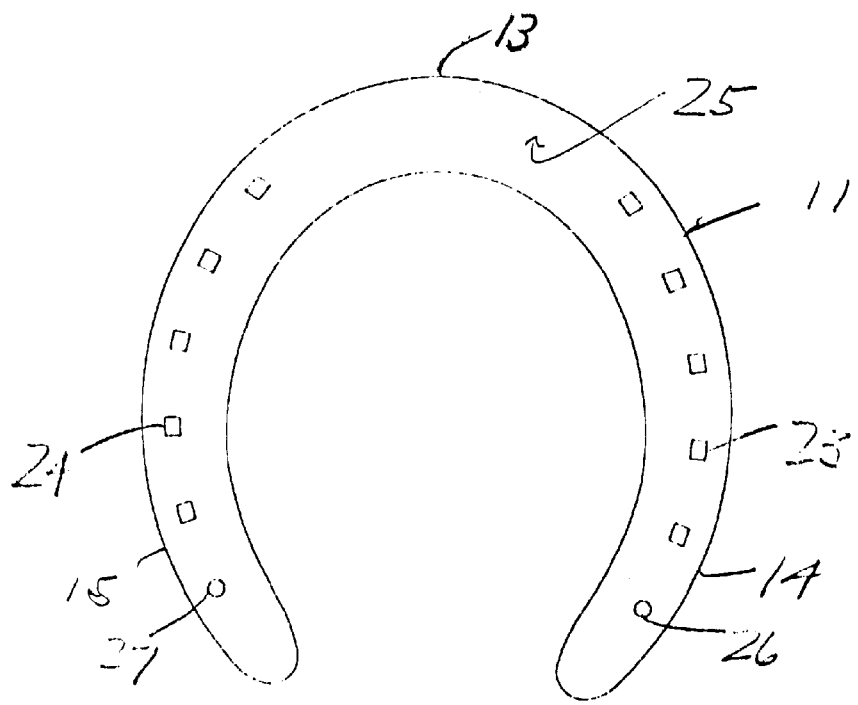
FIG. 2 is a cross-section taken at line 2—2 in FIG. 4.
Figure 3:
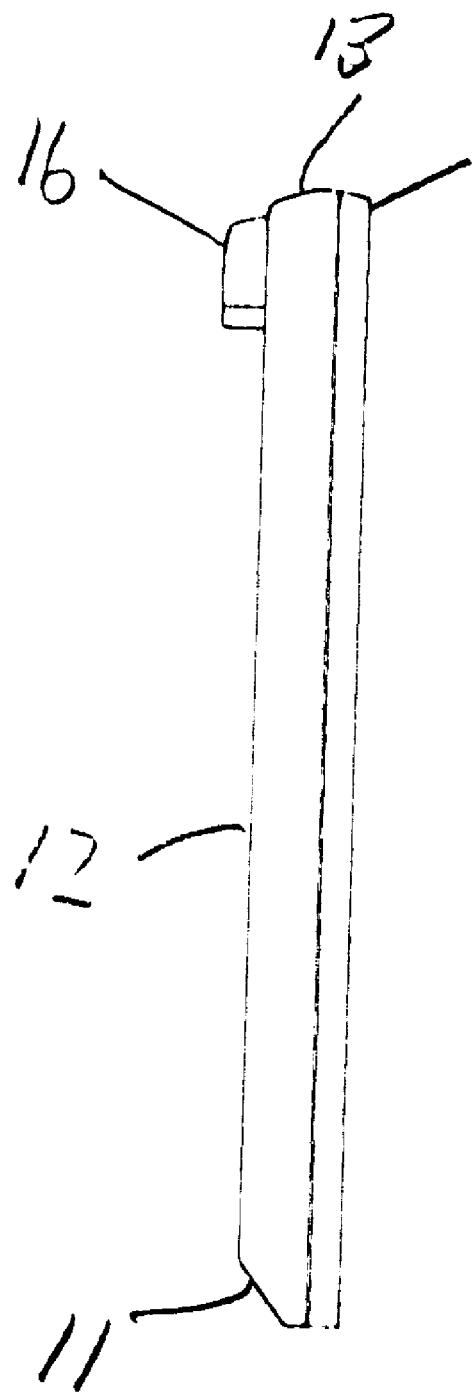
FIG. 3 is a right hand end view of FIG. 1, the left hand end being its mirror image.
Figure 4:
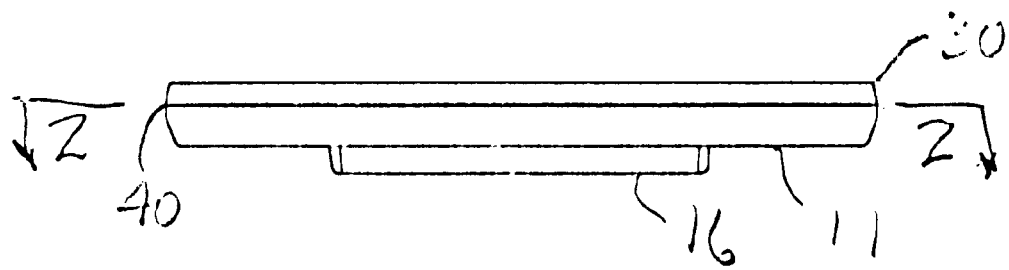
FIG. 4 is a top view of FIG. 1.
Figure 5:
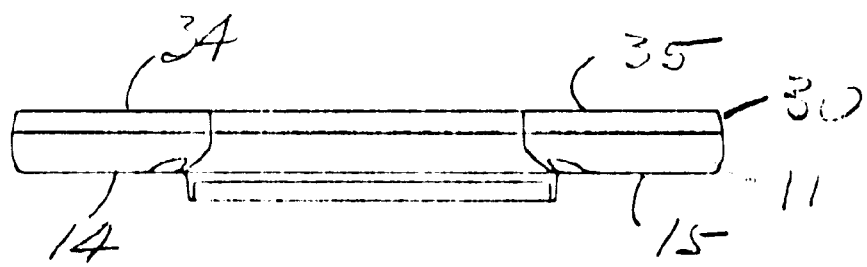
FIG. 5 is a bottom view of FIG. 1.
Figure 6:
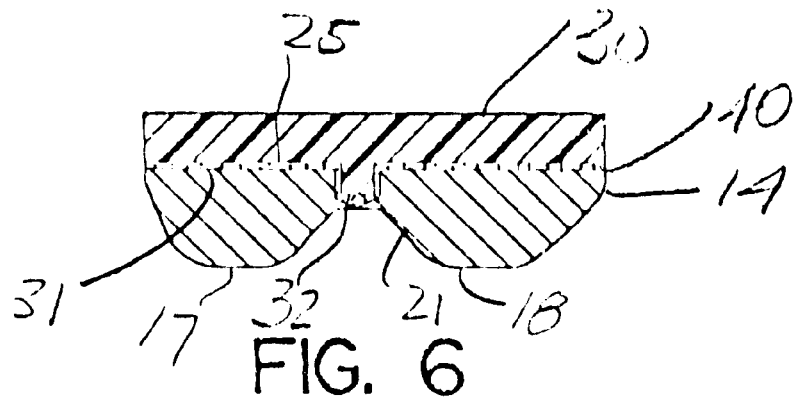
FIG. 6 is a cross-section taken at line 6—6 in FIG. 1.

The other side of metal shoe 11 is a flat surface 25 (FIG. 2) of particular importance are recesses 26, 27 in arms 14 and 15, respectively. As shown in FIGS. 2, and 6 these are preferably circular recesses which extend only partway into the shoe.

A flexible pad 30 has a flat surface 31 laid on flat surface 25 of the metal shoe. Studs 32 are preferably formed integrally with the pad and project from it. When the pad is molded, the stud will be formed in the same mold. They are generally circular so as to make a tight fit in recesses 26 and 27, and are respectively located near the tip end of arms 34 and 35 of the pad. Only stud 32 in recess 26 is shown (FIG. 6). An identical stud is placed in recess 27. The pad dimensions are substantially the same as those of surface 25. Their outer peripheries are substantially congruent.

The pad is made of an organic plastic polymeric substance which is resilient enough to withstand the pounding given to it by the hoof, and flexible enough to attenuate at least some vibration energy. It is best practice to mold this pad in a single piece. A suitable material of construction is a flexible highly plasticized polyvinyl chloride, with shore hardness about 75. A thickness of about $3/16$ inches will ordinarily be sufficient. A much larger thickness will add unnecessary weight.

The recess will preferably be about $3/16$ inches in diameter with a depth of about $3/64$ inches. The cavity may be further deepened at its center by a conical depression 36 caused by a drill point if the recess is made by separate drilling operation after the metal shoe is cast.

A layer 40 of cement joins flat faces 25 and 31 and also joins the walls of the studs to the wall of their respective recess. Any suitable cement may be used. One suitable cement is a linear saturated polyester cross-linked with poly isocyanate.

Figure 7:
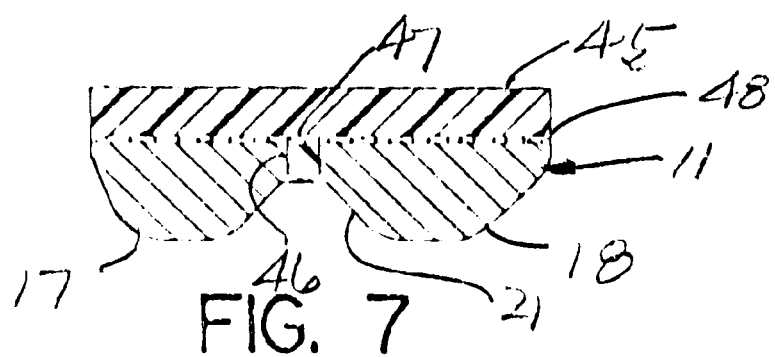
FIG. 7 is a view similar to FIG. 6 showing an alternate construction.

Occasionally it may be preferred to form the stud separately from the pad and attach it to the pad. This technique will be used when the pad is cut from a sheet instead of being molded in a single piece. As shown in FIG. 7, a pad 45 and a cylindrical stud 46 are joined by a layer 47 of cement, and will thereafter be attached to the metal shoe in the same manner as above. It is preferable to mold the stud along with the pad to eliminate the discontinuity caused by cement 47, but the resulting construction is suitable for many applications. Cement layer 48 joins the remainder of the pad and the studs to the metal shoe. The stud will be made of "like" material meaning an organic plastic material rather than metal. In FIG. 7, an organic material can used for the stud which is different from the material of the pad, but this would rarely be an advantage.

The retention of the pad near the tips of the arms without creating any risk of undesirable contact of a rivet or other fastener with the hoof provides important advantages, especially for the higher class of race horse and for heavier horses.

This invention is not to be limited by the embodiments shown in the drawings and described in the description, which are given by way of example and not of limitation, but only in accordance with the scope of the appended claims.

I claim:

1. In a U shaped horseshoe having a central bight, an arm extending from each end of said bight, and a tip on the other end of each arm, said horseshoe including a metal shoe having a wear surface for contact with the ground and an oppositely facing flat surface, a flat resilient pad having a first surface facing and overlaying said flat surface of the shoe and a second flat surface on its opposite side to lay directly against the hoof, the improvement comprising:

a recess in the flat surface of the metal shoe in each of said arms, spaced from each respective tip and located in the region near the tip where a nail cannot effectively be driven into the hoof when the horseshoe is nailed to the hoof, said recess having a wall, and a stud on said first surface of said pad, said stud being so proportioned as to fit closely in said recess in contiguity with the wall of the recess, and a layer of cement between and joining the flat surface of the metal shoe to the first surface of the pad, and the stud to the wall of the recess.

2. A horseshoe according to claim 1 in which the studs are formed integrally with the pad.

3. A horseshoe according to claim 1 in which the studs are cemented to the pad.

4. A horseshoe according to claim 1 in which nail holes are formed through each arm of the metal shoe to pass a horseshoe nail.

\* \* \* \* \*